United States Patent
Martynov et al.

(10) Patent No.: US 10,902,959 B2
(45) Date of Patent: Jan. 26, 2021

(54) METHOD AND DEVICE FOR CONTROL OF OXYGEN CONCENTRATION IN A NUCLEAR REACTOR PLANT

(71) Applicant: JOINT STOCK COMPANY "AKME-ENGINEERING", Moscow (RU)

(72) Inventors: Petr Nikiforovich Martynov, Obninsk (RU); Konstantin Dmitrievich Ivanov, Obninsk (RU); Radomir Shamillevich Askhadullin, Obninsk (RU); Aleksey Nikolaevich Storozhenko, Obninsk (RU); Andrey Alekseevich Simakov, Obninsk (RU); Aleksandr Urievich Legkih, Obninsk (RU)

(73) Assignee: JOINT STOCK COMPANY "AKME-ENGINEERING", Moscow (RU)

( * ) Notice: Subject to any disclaimer, the term of this patent is extended or adjusted under 35 U.S.C. 154(b) by 606 days.

(21) Appl. No.: 15/317,796

(22) PCT Filed: Jun. 11, 2015

(86) PCT No.: PCT/RU2015/000364
§ 371 (c)(1),
(2) Date: Dec. 9, 2016

(87) PCT Pub. No.: WO2015/190952
PCT Pub. Date: Dec. 17, 2015

(65) Prior Publication Data
US 2017/0117062 A1    Apr. 27, 2017

(30) Foreign Application Priority Data
Jun. 11, 2014    (RU) ............... 2014123858

(51) Int. Cl.
G21C 15/02    (2006.01)
G21C 17/025    (2006.01)
(Continued)

(52) U.S. Cl.
CPC .......... G21C 15/02 (2013.01); G21C 15/247 (2013.01); G21C 17/025 (2013.01); G21C 19/303 (2013.01)

(58) Field of Classification Search
CPC ...... G21C 15/02; G21C 15/247; G21C 17/02; G21C 17/025; G21C 19/303
See application file for complete search history.

(56) References Cited

U.S. PATENT DOCUMENTS

| 4,382,059 A * | 5/1983 | Doi ............ G21C 7/00 376/210 |
| 6,019,942 A * | 2/2000 | Gromov ......... C23C 22/68 106/14.05 |

FOREIGN PATENT DOCUMENTS

| RU | 2246451 C1 * | 2/2005 |
| RU | 2247435 C1 * | 2/2005 |

* cited by examiner

*Primary Examiner* — Lily C Garner
(74) *Attorney, Agent, or Firm* — Sughrue Mion, PLLC

(57) ABSTRACT

The method and system for control of oxygen concentration in the coolant of a reactor plant including a reactor, coolant in the reactor, gas system, mass-exchange apparatus, disperser and an oxygen sensor in the coolant have been disclosed. The method includes the following steps implemented by the system: estimation of the oxygen concentration; comparison of the oxygen concentration with the permissible value; if the oxygen concentration is reduced, comparison of the reduction value and\or rate with the corresponding threshold value; if the reduction value and\or rate of oxygen concentration is below the threshold value, activation of the mass-exchange apparatus; if the reduction (Continued)

value and/or rate of oxygen concentration is above the corresponding threshold value, supply of oxygen-containing gas from the gas system to the near-coolant space and/or activation of the disperser. Technical result: improvement of controllability of oxygen concentration in coolant, enhancement of safety and extension of reactor plant operating life.

1 Claim, 7 Drawing Sheets

(51) Int. Cl.
*G21C 19/303* (2006.01)
*G21C 15/247* (2006.01)

METHOD AND DEVICE FOR CONTROL OF OXYGEN CONCENTRATION IN A NUCLEAR REACTOR PLANT

CROSS REFERENCE TO RELATED APPLICATIONS

This application is a National Stage of International Application No. PCT/RU2015/000364 filed Jun. 11, 2015, claiming priority based on Russian Federation Patent Application No. 2014123858 filed Jun. 11, 2014, the contents of all of which are incorporated herein by reference in their entirety.

FIELD OF THE INVENTION

The invention relates to nuclear power industry and nuclear reactor plants, and more particularly to nuclear reactor plants with liquid-metal coolants. At the same time, this invention may also be applied to various non-nuclear reactor plants.

BACKGROUND OF THE INVENTION

One of the key problems of nuclear reactor plants with liquid-metal coolants is corrosion of reactor structural materials. To prevent corrosion, the technique for formation of protective oxide coatings is used. The corrosion resistance of reactor structural materials, for example, steel, depends on the integrity of these coatings.

It should be noted that the mentioned problem may occur both in nuclear reactor plants with non-liquid-metal coolants and in non-nuclear reactor plants. Although, this invention is described in relation to nuclear reactor plants with liquid-metal coolants, it also can be used both in nuclear reactor plants with non-liquid-metal coolants and in non-nuclear reactor plants.

Oxygen is traditionally used for formation of oxide coatings. When the reactor plant is in operation, the components of structural materials, such as iron, chrome and others, diffuse into coolant. Due to the fact that the mentioned components of structural materials have higher chemical affinity for oxidizers, for example, oxygen, the increase in concentration of iron, chrome and other components of structural materials in the coolant causes reduction in concentration of oxidizers, such as oxygen. It may lead to dissolution of protective oxide coatings, which will significantly increase the corrosion rate. Consequently, to reduce the corrosion rate to a minimum level ensuring the long-term operation of a reactor plant in safe mode, it is required to supply oxidizer to the coolant to increase its concentration to such a level when the protective oxide coatings are not dissolved in the coolant. In this regard, oxygen is a quite suitable oxidizer as it can be supplied to a coolant in the form of gas or oxides of different materials, for example, those of which the coolant is made.

In view of the above, it is important to control and maintain the required concentration of oxidizer in the coolant, in particular, concentration of oxygen, so that the protective oxide coatings on the inner surface of reactor contacting with the coolant are not dissolved in the coolant, thereby preventing corrosion of reactor materials. As oxygen is constantly consumed for oxidation of iron, chrome and other components of construction materials diffusing into coolant, to maintain the concentration of oxygen within the specified range ensuring the minimum corrosion rate of reactor materials, oxygen shall be supplied to the coolant, for example, when the lower limit of the specified range is reached or oxygen concentration is reduced below the admissible level.

Patent RU2100480 (issued on Dec. 27, 1997) discloses such methods for increase of oxygen concentration in the coolant as injection of oxygen admixed with inert gas to the protective gas above the coolant surface or directly to coolant, as well as dissolution of coolant component oxides in the coolant.

However, the methods described in the mentioned patent have such disadvantages as impossibility to control oxygen injection into the coolant (increase of oxygen concentration in the coolant), namely: start/end of oxygen supply and dissolution of coolant oxides, measuring rate of oxygen concentration in the coolant, i.e. volumes of oxygen to be supplied and coolant oxides to be dissolved. Besides, when supplying the oxygen admixed with inert gas to the volume of protective gas above the coolant surface, the rate of oxygen diffusing into the coolant is relatively low, and the risk of formation of oxide film (crust) on the coolant surface is increased with rise of oxygen fraction admixed with inert gas.

Patent RU2246561 (issued on Feb. 20, 2005) discloses the method and device for controlled dissolution of coolant oxides in the coolant, but does not include any data on the possibility for control of oxygen injection into the coolant in the gaseous form.

INVENTION DISCLOSURE

The purpose of this invention is to provide the method and device for control of oxygen concentration in the reactor plant, and more particularly, in the coolant of a nuclear reactor plant supplied in the gaseous form. Moreover, the purpose of this invention is to ensure efficient and safe preparation and operation of nuclear reactor plant in different modes, such as passivation mode of reactor's structural materials, normal operation mode, abnormal mode during destruction of protective oxide coatings and others. In view of the above, other objectives of the invention are to switch between the methods for control (increase) of oxygen concentration in the coolant, improve safety of equipment used for oxygen concentration control and provide the equipment control system ensuring the safe preparation and operation of nuclear reactor plant in all modes.

The purpose of this invention is achieved by using the method for control of oxygen concentration in the coolant of a reactor plant containing a reactor, a coolant located in the reactor, a gas system with an outlet to the near-coolant space of reactor, a mass-exchange apparatus installed in the coolant which holds solid-phase coolant oxides and is adapted to flowing of coolant through it, a disperser installed partially in the coolant and partially in the near-coolant space and adapted to gas supply from the near-coolant space to the coolant, and an oxygen sensor in the coolant.

Using the method, proceed as follows: estimate the oxygen concentration in the coolant based on the data received from oxygen sensor in the coolant; compare the estimate of oxygen concentration with the permissible value; if the estimated change in the oxygen concentration in the coolant shows reduction in concentration, compare the reduction value and\or rate with the corresponding threshold value; if the estimate of oxygen concentration in the coolant is below the permissible value and the estimated reduction value and\or rate of oxygen concentration is below the corresponding threshold value, activate the mass-exchange apparatus; if the estimate of oxygen concentration in the coolant is below the permissible value and the estimated reduction value and/or rate of oxygen concentration is above the corresponding threshold value, supply oxygen-containing gas from the system to the near-coolant space and/or activate the disperser.

If after the activation of mass-exchange apparatus or supply of oxygen-containing gas, and activation of disperser the estimated concentration of oxygen in the coolant reaches or exceeds the allowable value, the preferable option of the method suggests deactivation of the mass-exchange apparatus or disperser and/or stopping the supply of oxygen-containing gas to the near-coolant space from the gas system. Besides, oxygen-free gas can be supplied from the gas system to the near-coolant space in addition to ceasing the supply of oxygen-containing gas from the gas system to the near-coolant space.

The purpose of this invention is also achieved by using the control system of oxygen concentration in the coolant of reactor plant which includes a reactor, a coolant located in the reactor, a gas system with an outlet to the near-coolant space of the reactor, a mass-exchange apparatus installed in the coolant which holds solid-phase oxides of the coolant and is adapted to flowing of coolant through it, a disperser installed partially in the coolant and partially in the near-coolant space and adapted to gas supply from the near-coolant space to the coolant, and an oxygen sensor in the coolant.

The control system includes: module for estimating the oxygen concentration in the coolant designed so as to receive data from an oxygen sensor in the coolant, to estimate oxygen concentration based on the received data on oxygen concentration in the coolant and transmit the estimation to the module for comparing the estimate of oxygen concentration in the coolant with the permissible value; module for comparing the estimate of oxygen concentration in the coolant with the permissible value adapted to acquire the estimates of oxygen concentration in the coolant from the oxygen concentration estimation module and compare it with the permissible value; module for estimating the reduction in oxygen concentration in the coolant adapted to estimate the reduction value and/or rate of oxygen concentration in the coolant as well as to transmit the estimated reduction value and/or rate of oxygen concentration in the coolant to the module for comparing the estimated reduction in oxygen concentration in the coolant; module for comparing the estimated reduction in oxygen concentration in the coolant adapted to receive the estimated reduction value and\or rate of oxygen concentration in the coolant and its comparison with the corresponding threshold value; module for control of mass-exchange apparatus configured to activate the mass-exchange apparatus in case the estimated oxygen concentration in the coolant is below the permissible value and the estimated change value and/or rate of oxygen concentration is below the corresponding threshold value; module for control of gas system and/or disperser configured to activate the gas system with the supply of oxygen-containing gas to the near-coolant space and/or activate the disperser in case the estimated oxygen concentration in the coolant is below the permissible value and the estimated change value and/or rate of oxygen concentration is above the corresponding threshold value.

In one of its adaptations, the module for estimating the reduction in oxygen concentration in the coolant can be configured to estimate the reduction value and/or rate of the oxygen concentration in the coolant based on the estimated oxygen concentration in the coolant received from the module for estimating the oxygen concentration in the coolant. Besides, some versions of the module for comparing the estimate of reduction in oxygen concentration in the coolant can be adapted to determinate the reduction in oxygen concentration in the coolant and transmit information to the module for comparing the estimate of reduction in oxygen concentration in the coolant and/or to the module for control of the mass-exchange apparatus and the module for control of the gas system and/or disperser.

In its preferable embodiment, the module for control of mass-exchange apparatus is adapted to deactivate the mass-exchange apparatus and the module for control of the gas system and disperser and/or the module for ceasing the supply of oxygen-containing gas from the gas system to the near-coolant space, if the estimate of oxygen concentration in the coolant assumes or exceeds the permissible value. Besides, the module for control of gas system and disperser can be adapted to supply oxygen-free gas from the gas system to the near-coolant space.

The purpose of this invention is also achieved by using the nuclear reactor plant which includes: a reactor, a coolant located in the reactor, a gas system with an outlet to the near-coolant space of the reactor, a mass-exchange apparatus installed in the coolant which holds solid-phase oxides of the coolant and is adapted to the flowing of the coolant through it, a disperser installed partially in the coolant and partially in the near-coolant space and adapted to supply gas from the near-coolant space to the coolant, and an oxygen sensor in the coolant. The mentioned reactor plant is adapted to control hydrogen concentration in the coolant in accordance with a method or system as per any above-described options.

This invention enables to achieve such technical result as provision of the method and device for control of oxygen concentration in the reactor plant, in particular, in the coolant of a nuclear reactor plant supplied in the gaseous form. Besides, it enables to achieve such technical result as provision of efficient and safe preparation and operation of nuclear reactor plant in different modes, such as passivation mode of reactor's structural materials, normal operation mode, abnormal modes during destruction of protective oxide coatings and others. Apart of the above mentioned, the following technical results have been achieved: switching between the methods for control (increase) of oxygen concentration in the coolant; improvement of safety, reliability and extension of the operating life of the equipment used for control of oxygen concentration, and provision of the equipment control system ensuring the safe preparation and operation of nuclear reactor plant in all modes.

EMBODIMENT OF INVENTION

Figure 1:
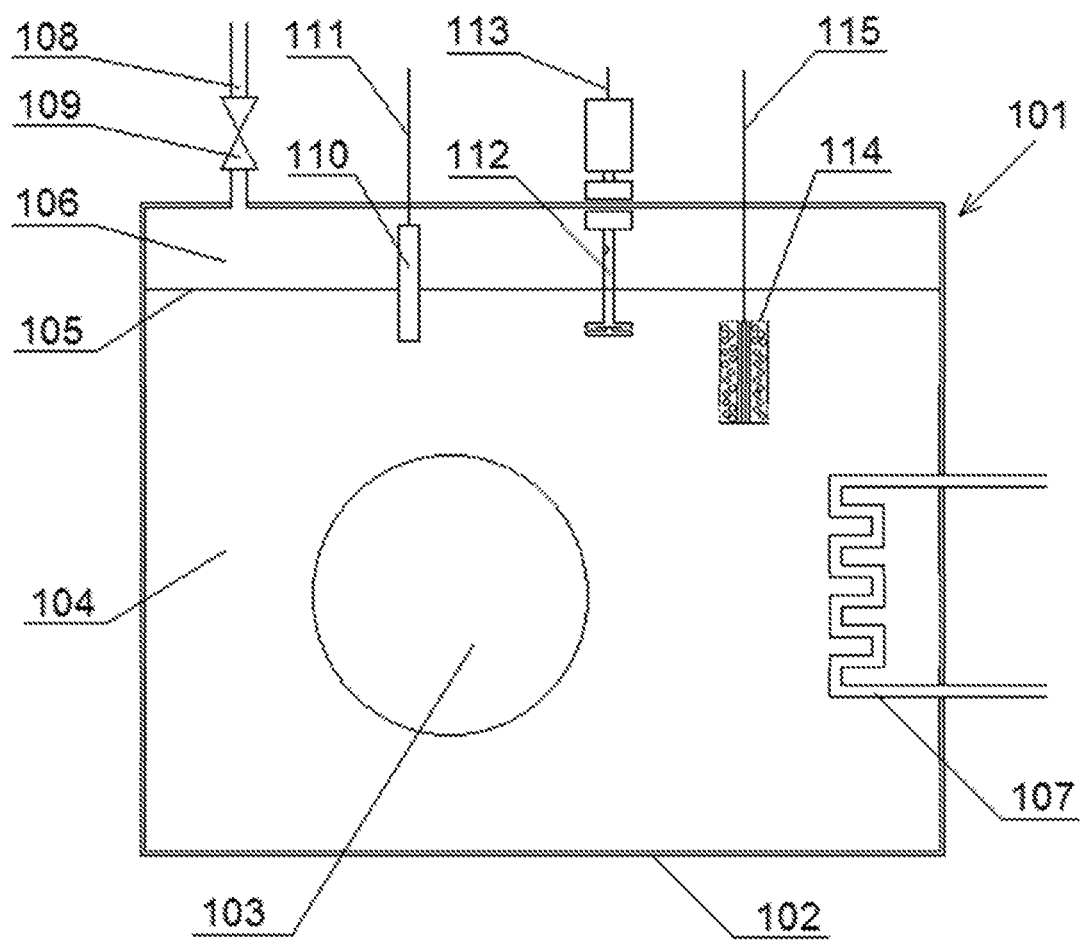
FIG. 1 shows a schematic view of reactor plant in accordance with this invention.

This invention applies to a reactor plant (for example, nuclear reactor plant) which includes, as per FIG. 1, a reactor 101, a coolant 104, a gas system 108, a mass-exchange apparatus 114, a disperser 112 and an oxygen concentration sensor 110, in the coolant 104.

A reactor 101 is a tank, the walls 102 of which are made of materials with adequate mechanical, thermal, radiation and other types of durability necessary for safe operation of a reactor plant, such as steel. Safe operation of reactor plants is of particular importance due to the fact that the reactor core 103 contains radioactive materials which release energy in the course of radioactive fission. A certain quantum of this energy in the form of heat is transferred to the coolant 104 located in the reactor and contacting with the core (i.e. the radioactive materials are located in the coolant), and further transported to the heat exchanger 107 where the heat energy is transferred to other materials (for example, water, steam and other heat-absorptive materials), at a distance from the radiation source. In some embodiments of the invention the heat exchanger can be a steam generator designed to generate steam which can be used for heating of other media or activation of turbines. After the heat exchanger 107, the heat energy is transferred through utility systems beyond the reactor without hazard of radiation contamination which, therefore, is concentrated within the reactor. In connection to this, due to drastic, undesired and long-term effects of radiation contamination of surrounding areas the special emphasis is placed on the strength and safe operation of the reactor. It is preferable to circulate the coolant in the reactor 101, in the circuit covering the core and the heat exchanger, for long-term and efficient transfer of heat from the core 103 to the heat exchanger 107 of the reactor. Pumps can be used for circulation (not shown in FIG. 1).

One of the important factors to retain the reactor strength through time is preventing or mitigating corrosion of structural materials of reactor walls 102, its reinforcing, fixture, strength and other elements to the admissible level. The mentioned factor shall also be considered when a coolant from liquid metals such as sodium, lithium, lead, bismuth and etc. is used as the coolant 104. Heavy metals (lead, bismuth) have an advantage over light-weight metals because of their increased safety, particularly, in terms of low fire hazard.

Besides, the coolants made of heavy metals have such an advantage as stability of their properties in case of water ingress. Naturally, the physical and chemical properties of such a coolant will change in case of water ingress, but such changes will be insignificant and allow further operation. This can be useful for improving safety of a reactor plant in view of possible accidents or leakages of equipment where water is present or flows in the liquid form or in the form of steam, for example, heat exchangers or steam generators. Even if a heat exchanger or steam generator is faulty (have a leakage), the reactor plant can be operated before repair or replacement of faulty (leaking) equipment, as the coolant made of heavy metals allows such operation mode due to the insignificant (uncritical) dependence of its physical and chemical properties on injection of liquid or vaporous water.

To reduce corrosion effect on structural materials of the reactor, it is considered advantageous to create oxide coatings on the boundary between the coolant and structural material, for example, by supplying oxygen or oxygen-containing materials to the coolant; upon that such materials can be transferred by the coolant towards the reactor walls where oxygen can react with the structural materials (for example, steel) and form an oxide in the form of an oxide film. An additional advantage of such anticorrosion protection is reduction of heat-exchange rate between the coolant and reactor walls due to low thermal conductivity of oxides.

Oxygen can be injected into the coolant in several ways. To implement one of the ways, the reactor plant shall include a gas system 108 with an outlet to the reactor 101 to the space 106 near the coolant 104 (in the preferable embodiment shown in FIG. 1, above the coolant). Coolant 104 occupies only a part of the reactor tank to reduce the hazard of reactor depressurization due to thermal expansion of the coolant during heating. The upper part 106 of the reactor tank located above the surface 105 ("level") of the coolant 104 shall be filled with inert gas (He, Ne, Ar) or a mixture of inert gases to prevent corrosion and undesired chemical reactions. Gas system 108 is provided to supply gas to the space above the coolant or near it, which in other embodiments can be a space separated from the coolant reservoir.

Gas system 108 includes pipelines (pipes), isolation valves 109, filters, pumps and other equipment commonly used in gas systems and known from the background of the invention. The gas system is connected to the sources of inert gases and oxygen and is configured to mix them. Thus, the gas system is able to supply not only an inert gas or a mixture of inert gases. To resist corrosion, an oxygen-containing gas, for example, a mixture of an inert gas and oxygen (pure oxygen is of serious hazard to structural materials of the reactor and liquid-metal coolant) can be supplied to the near-coolant space of the reactor. Gaseous mixture may contain, $\frac{1}{5}$ or less of oxygen, such ratio demonstrates sufficient activity of oxygen contained in the gas, without unwanted risks for structural materials and the coolant.

Particularly, inert gases and oxygen can be supplied from the tanks with pressurized gases to pipelines or mixing tanks of the gas system by adjusting the isolation valves (for example, valves with electrical or hydraulic actuators) or activating the impelling pumps which pump these gases from storage tanks to the required mixing tanks or pipelines, under relevant conditions of isolation valves on interconnecting pipes/pipelines. These gases or their mixtures can be supplied to the near-coolant space of the reactor by means of pipelines from the storage or mixing tanks by means of proper control of the isolation valves and/or pumps (if the pumps can not be activated, the gas may be supplied by means of increased pressure under which they are kept in the corresponding tanks).

If the oxygen-containing gas is supplied to the near-coolant space of the reactor, oxygen can diffuse into coolant or oxidize its components, for example, bismuth and lead; and the coolant oxides can be carried over inward the reactor by means of convection or circulation where they can oxidize the mentioned components upon contact with the components of structural materials such as Fe, Cr, Zn and others. It happens due to the fact that those components have higher chemical affinity for oxygen than bismuth and lead (for example, thereby recovering these coolant components). Such a method for sustaining oxide films on the surface of structural materials to prevent corrosion can be used, for example, in steady-state modes when the consumption of oxygen for oxidation of structural material components complies with flow rate of oxygen delivered from the near-coolant space through the surface of the coolant (and the implementation of this method for the control of oxygen concentration in the coolant can be accounted by the control system of the reactor plant). However, this method for sustaining oxygen concentration in the coolant necessary for anticorrosion protection has such disadvantages as delayed action and low controllability of the process resulting from low efficiency of passive penetration of oxygen into the liquid coolant from gas as well as impossibility of oxygen concentration buildup in the coolant due to the increase of oxygen fraction in gas owing to high adverse impact of oxygen on structural materials in the near-coolant space of reactor and the increase of hazard for formation of oxide film on the coolant surface.

Therefore, the injection of oxygen into the coolant by diffusing through the coolant surface provides almost infinite source of oxygen. But such method for the increase of oxygen concentration in the coolant is not very accurate, but slow and uncontrollable. Corrosion resistance of structural materials requires a controlled, accurate and faster method for increase of oxygen concentration in the coolant. Such a method can be provided with the use of mass-exchange apparatus 114 installed in the coolant 104.

The mass-exchange apparatus can be a container for the solid-phase oxides of coolant to be kept. For example, if the coolant consists of lead and/or bismuth, the mass-exchange apparatus may contain solid-phase oxides of lead and/or bismuth in the form of small grains. The solid-phase oxides can be dissolved in the coolant and owing to the fact that they are oxides of coolant components, the effect, to a certain extent, will be similar to penetration of oxygen from a gas medium and oxidation of the mentioned components, but in this case there is a possibility to control the intensity of the process. The coolant shall flow through the mass-exchange apparatus to dissolve the solid-phase oxides of coolant components in the coolant. For this purpose, the housing of the mass-exchange apparatus containing the oxides of coolant components, for example, in granular form, shall have holes for the coolant to flow through.

Dissolution efficiency (velocity) of solid-phase oxides of coolant components in the coolant depends, particularly, on the velocity of coolant flow through the mass-exchange apparatus. To control the velocity of coolant flow through the mass-exchange apparatus, a pump can be provided in the mass-exchange apparatus or in that part of reactor tank where the mass-exchange apparatus is located. This pump shall pump the coolant with different velocities and the operation of this pump can be controlled externally (remotely). The velocity of coolant flow through the mass-exchange apparatus can be controlled by means of a heater which heats the coolant, and thus its convection occurs. Heater operation can be controlled externally (remotely). The use of the heater has an advantage over the pump due to the fact that the heater is not equipped with moving elements, which is very important for the extension of mass-exchange apparatus operating life and general improvement of reactor safety, since the mass-exchange apparatus (and therefore a heater or a pump) operates in hot coolant under high radiation activity.

The dissolution efficiency (velocity) of solid-phase oxides of coolant components in the coolant also depends on the volume and surface area of solid-phase oxides of the components the coolant contacts with. The volume of the tank where the oxides (for example, in the form of small grains) are contained and through which the coolant flows can be controlled with the use of valves which, in turn, can be controlled remotely, for example, with the use of an electric actuator.

Besides, the dissolution efficiency (velocity) of solid-phase components in the coolant also depends, on the temperature of interacting coolant and/or solid-phase components of the coolant. Their temperature can also be controlled by means of a heater the operation of which can be controlled externally (remotely).

Therefore, there are many different methods to control dissolution efficiency (velocity) of coolant solid-phase components in the coolant; some of them are described above. In this invention all these methods are collectively referred to as "activation" ("to activate") of mass-exchange apparatus, as it is associated with excessive dissolution of solid-phase components the coolant. In "non-activated" ("deactivated") state, i.e. when, for instance, a pump or heater which increases the flow of the coolant through the mass-exchange apparatus is switched off, or when the valves are set to such a position that the coolant flows around the minimum quantity of coolant solid-phase components or does not flow around them at all, or when the heater used to raise the temperature of the coolant and/or its solid-phase components in order to increase the interaction efficiency is switched off (the examples are given in accordance with the above described methods for the increase of dissolution efficiency (velocity) of solid-phase components in the coolant; when using other methods the non-activated or deactivated state is determined as per the corresponding minimum efficiency (velocity) of dissolution of coolant solid-phase components in the coolant), the dissolution efficiency (velocity) of coolant solid-phase components in the coolant is minimum or equals zero (in general case it can have some value, as the coolant can pass through mass-exchange apparatus due to common circulation within the reactor (but not due to the inducement of flow by using additional methods described above), and the current temperature of interaction can cause dissolution in its own (not due to additional heating).

Consequently, when the term "activate the mass-exchange apparatus" is used, it means that the devices which increase the dissolution efficiency (velocity) of coolant solid-phase components in the coolant are switched on. On the contrary, the term "deactivate mass-exchange apparatus" means that the devices which increase the dissolution efficiency (velocity) of coolant solid-phase components in the coolant are switched off or switched over to the position when the efficiency (velocity) has a minimum possible value.

Activation/deactivation can ensure two or more states of equipment activity. In case of two states, when the mass-exchange apparatus may have minimum (or zero) activity and maximum activity, the oxygen delivered to coolant can be controlled by the time during which the mass-exchange apparatus is in the state of maximum activity. If more activity states are established for the mass-exchange apparatus, the velocity of oxygen injection into the coolant can be controlled as well (i.e. the volume of solid-phase components being solved in the coolant per time unit). In a limiting case the discrete, not analog, continuous in its value control of mass-exchange apparatus activity can be provided, which even more enhances the possibility to control dissolution efficiency (velocity) of coolant solid-phase components in the coolant, which, in turn, improves control accuracy.

Figure 2:
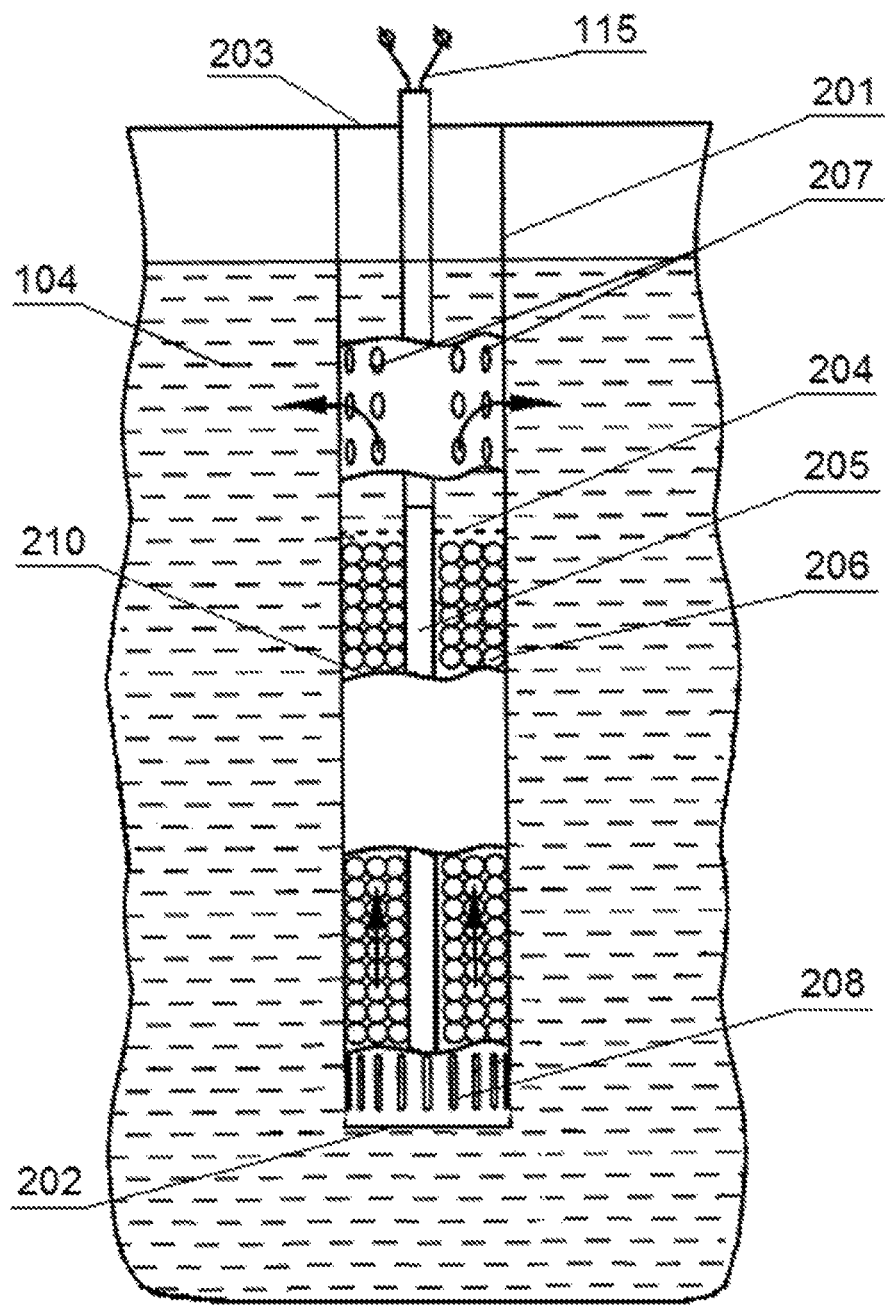
FIG. 2 shows an embodiment of mass-exchange apparatus.

FIG. 2 shows one of the possible embodiments of the mass-exchange apparatus. The mass-exchange apparatus includes a tank formed by its housing 201, limited by the bottom 202 and the cover 203. The tank includes a flow reaction compartment 210 located inside the tank below the coolant level and limited by a perforated grille 204 at the top.

The limiting grille 204 prevents the solid-phase granulated oxidant 206 from emergence under the buoyant force. The oxygen-rich coolant comes out of the mass-exchange apparatus through the limiting grille 204 and holes 207 in the housing wall 201 located in the upper part of the housing wall 201 above the limiting grille 204 and mixes with coolant of the reactor plant primary circuit.

The solid-phase oxidant 206 (in particular, solid-phase oxides of coolant components) placed under the grille 204 dissolves when interacting with coolant and enriches the coolant with oxygen. The heater 205 located in the reaction chamber 210 and passing through the perforated grille 204 is designed to heat the coolant in the reaction chamber 210. The inlet holes 208 are located in the wall of the housing 201 at the level of lower end plate of the electric heater 205, for the coolant to move through the layer of solid-phase oxidant placed in the reaction chamber 210 in the clearance between the housing 201 and the electric heater 205 during operation of mass-exchange apparatus. The outlet holes 207, inlet holes 208 and holes in the grille 204 are made, preferably, in the form of narrow slots smaller in size than the grains of solid-phase oxidant.

When operated the mass-exchange apparatus shall be immersed in the coolant so that the outlet holes 207 are in the coolant. The mass-exchange apparatus shall be located in the reactor so that the coolant flows through the place of installation. If the height of the coolant layer is insufficient for the immersion of mass-exchange apparatus, the place of installation shall be equipped with a pocket in which the housing of mass-exchange apparatus is sunk. The coolant can flow through the pocket owing to convective current of liquid-metal coolant through the reaction chamber during operation of the electric heater 205.

The mass-exchange apparatus shown in FIG. 2 operates as follows. When switching on the electric heater 205 by means of natural convection the coolant flows through granulated solid-phase oxidant 206 placed in the flow reaction chamber 210 in the clearance between the housing 201 and the electric heater 205. The coolant 104 (preferably liquid-metal coolant) comes from the surrounding space to the mass-exchange apparatus through inlet holes 208 and moves from the bottom up (as shown with arrows) through the granulated solid-phase oxidant 206 placed in the reaction chamber 210. Small grains of the solid-phase oxidant dissolve in the coolant when interacting with it and enrich the coolant with oxygen. The oxygen-rich coolant comes out of the mass-exchange apparatus through the outlet holes 207 and mixes with coolant of the reactor primary circuit. Capacity value, i.e. the amount of oxygen supplied from the mass-exchange apparatus per unit of time, is controlled by changing the power of the electric heater. The dissolution velocity of solid-phase oxidant is increased at high temperature. As the density of the solid-phase oxidant (for example, lead oxide) is less than the density of the coolant (lead or lead-bismuth), the solid-phase oxides of coolant components move upward and are held within the coolant body by the grille 204 which allows the coolant to flow through.

There are wires 115 in the upper part of the heating element 205 which are used for the supply of electric voltage to the heating element 205. Due to the fact that to activate the mass-exchange apparatus it is required only to heat the coolant with the heater 205, the normal operation of the mass-exchange apparatus 114 (shown in FIG. 1) requires wiring (cable 115) through the reactor vessel 102. The wires will supply electric current to heat the heating element 205 of the mass-exchange apparatus, and thereby activate it. It provides safe remote control of the mass-exchange apparatus operation (and therefore control of oxygen concentration in the coolant), as such design minimizes the number and size of holes in the reactor vessel and eliminates the necessity for penetration into the reactor vessel or depressurization of the reactor to control oxygen concentration in the coolant, which ensures a high degree of leak-tightness and strength of the reactor vessel and has a positive effect on the operating life and safe operation of the reactor plant.

The mass-exchange apparatus adequately controls the oxygen concentration in the coolant but it may be characterized by insufficient rate/efficiency of oxygen concentration increase. Besides, the reserve of consumables, solid-phase oxides of coolant components, is limited. Several mass-exchange apparatus of increased capacity can be installed in the reactor, but there might be restrictions on reactor volume and space required for other equipment of the reactor plant. Consequently, it requires such a method for oxygen concentration increase which will have a high rate/efficiency of concentration increase and high (infinite) volume of oxygen to be injected into the coolant.

To provide such a method for oxygen concentration increase in the coolant, the reactor 101 includes a disperser 112 which also provides a controlled way for the increase of oxygen concentration in the coolant 104 by injecting gas, which may contain oxygen, into the coolant 104 from the space 106 above the surface 105 of the coolant 104. For this purpose, the disperser 112 is installed partially in the coolant 104 and partially in the near-coolant space 104. Oxygen-containing gas can be injected into the coolant directly from the gas system pipeline, but in this case the pipeline will be sunk in the coolant, which may lead to plugging and clogging of the pipeline, thereby affecting safety and decreasing the operating life of the reactor plant.

In the preferable option shown in FIG. 1 the disperser 112 is installed vertically, as in this case the space 106 above the coolant 104 may be used as near-coolant space (therefore, no additional measures to arrange a separate space for gas are required), and the disperser 112 is set to position extending its operating life, as the coolant and the solid-phase oxides do not penetrate into the disperser or cause its clogging, which extends its operating life. As the disperser is able to supply gas from the near-coolant space to the coolant, the gas entrained through the hole in the upper part of disperser located, in a particular case, in the above-coolant space passes through a channel in the disperser (for example, in the shaft) downward and comes out of its lower part located in the coolant (the names of directions change accordingly at other layouts of disperser).

To inject gas into the coolant, increased pressure may be created in the near-coolant space; this pressure would cause the forced penetration of gas into coolant which has less internal pressure than disperser. Pressure value can be determined by means of pressure sensors in this space or space adjacent to it with the gas system pipeline, or according to the amount of gas pumped to this space which can be determined with the use of flow rate meters. For the disperser outlet holes not to be clogged, they are mainly made on the moving elements of disperser installed in the coolant, for example, on the lower end of a rotating disperser.

Apart from the creation of gas increased pressure in the near-coolant space, the gas can be injected into the coolant by creating a local zone of low pressure in the coolant, for example, near the disperser (entrainment of gas with coolant). This can be achieved with the use of discs in the lower part of disperser which may have blades. When rotating, the discs create a low-pressure area in the coolant under the action of centrifugal forces. The gas passing from the above-coolant space to the lower holes near the discs through the longitudinal channel goes to the mentioned low-pressure area. Due to the gradient of coolant velocity near the disperser, in particular, the discs, i.e. when the coolant near the disperser moves faster than in the area away from it, the gas entering the coolant in the form of bubbles is fragmented to smaller bubbles, thereby creating the finely-divided two-component suspension of gas-coolant. If the gas contains oxygen, the conditions for effective increase of oxygen concentration in the coolant are provided. Due to the fact that the disperser has moving (rotating) elements, the coolant moves (flows over) near the disperser surfaces, which washes the solid particles and films out of the disperser, thereby ensuring its automatic self-purification. This property increases the operating life of the disperser as well as the operating life and safety of operation of the reactor plant in general.

Figure 3:
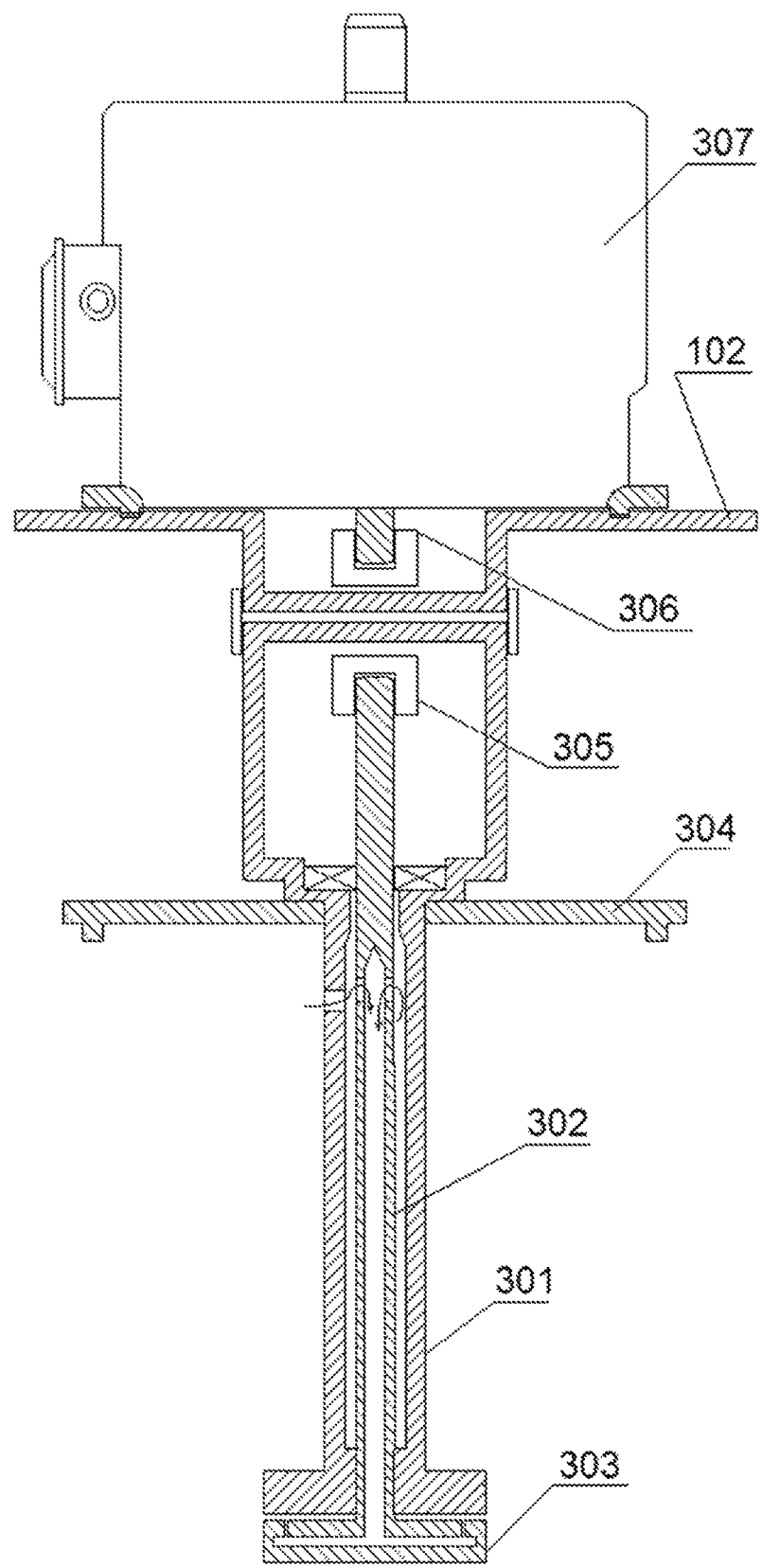
FIG. 3 shows an embodiment of disperser.

In the preferable option shown in FIG. 3 the disperser can have two discs, one of which rotates and another one does not. Such a combination creates a low-pressure area of the coolant between the discs; gas may get to this area from the holes in the shaft or in one or two discs. As it is possible to provide a sufficiently small distance between the discs, and one of the discs rotates relative to another, the pressure drops faster compared to a case when both discs rotate. As a result, the efficiency of gas injection into the coolant is improved and the gas bubbles become even smaller, i.e. the dissolution efficiency of gas, in particular, oxygen, in the coolant is improved, and thereby the oxygen concentration is increased.

The injection of oxygen-containing gas into the coolant and oxygen concentration in the coolant are regulated due to the control capability of gas system operation which can create increased pressure in the near-coolant space, and due to the control capability of disperser operation which in passive state (without rotation of discs) does not inject gas into coolant from the above-coolant space and in active state (with rotation of discs) injects oxygen-containing gas into the coolant from the above-coolant space, and the rate (efficiency) of gas injection into coolant can depend on the disc rotation speed. Application of dispersers with rotating discs is more reasonable, because it does not require to create increased pressure to inject gas to the coolant from the near-coolant space, but it is sufficient to actuate ("activate") the disperser, which simplifies and thereby enhances the reliability of control system operation.

To actuate ("activate") the disperser, it is required to rotate the shafts and discs (or one of the shafts and one of the discs). This may be done with the use, for example, of an electric motor. To reduce the destructive effect of high temperatures and vapors of the coolant on the electric motor and, consequently, to extend its operating life, the motor shall be located outside the reactor (although, in some embodiments it can be located inside). To rotate the disperser parts, the shaft may be passed through the reactor wall from the electric motor. For this purpose, the wall shall have an opening. However, to improve the reactor structural strength and thereby its operational safety, the preferable embodiment allows the rotation to be transferred from the electric motor to the disperser elements with the use of magnetic coupling the parts of which are installed opposite each other on the different sides of the reactor wall. The magnetic field formed by a magnetic half-coupling can transfer the rotary force to another half-coupling located on the other side of the reactor wall, thereby actuating the disperser. If the disperser motor is located outside the reactor, it can be controlled through a wire (cable) 113 shown in FIG. 1 designed for the supply of electric power to the electric motor by supplying or not supplying the power voltage or changing its parameters.

In this invention the actuation of disperser by means of an electric motor is designated as "activation" of the disperser and the shutdown of an electric motor when the disperser stops operating is designated as its "deactivation". Rotation speed of the electric motor can be controlled in different ways: in a binary way (cut-off/cut-in), at different rotation speeds or with a possibility to set any rotation speed within the specified range. Consequently, the higher rotation speed is, the more gas (including oxygen) is dissolved in the coolant and the smaller gas bubbles are formed.

The solid electrolyte oxygen sensor shown in FIG. 3 consists of the following main elements: disperser housing 301 with a stationary upper disc; hollow shaft 302 connected to the lower rotating disc 303; flange 304 fastening the disperser to the reactor vessel; electric motor 307 with drive magnetic half-coupling 306 transferring rotation to the hollow shaft 302 with the use of a driven magnetic half-coupling 305. The electric motor 307 with half-coupling 306 is installed on the outside of the reactor wall 102, and the half-coupling 305 is installed on the inside of the reactor wall 102.

In the preferable option shown in FIG. 3 the upper disc (stator) of the disperser is rigidly connected to the disperser housing 301. The lower rotating disc 303 is connected to the rotating shaft 302. The lower disc and the shaft are hollow, their cavities are interconnected. In the upper part the shaft cavity is connected to the gas circuit through holes. The holes of small diameter (at least 12 holes) are punched on the surface of the lower disc forming a clearance; these holes are located in a circumferential direction. The upper disc can also have small holes for injection of liquid metal into the cavity between the discs. In the upper part the rotating shaft is connected to the shaft of the sealed electric motor 307 powered from the frequency converter by means of magnetic half-couplings 305 and 306.

The disperser is immersed in the coolant so that the holes in the upper part of the shaft are above the liquid level, and the upper and lower discs are below the liquid level. When the sealed electric motor is run, the lower disc rotates with the prescribed angular velocity. As a result of coolant movement relative to the lower disc, a low-pressure area is formed in the clearance, which provokes the injection of gas into the clearance from the cavity of the lower disc through the holes in its upper part. Due to the velocity gradient of coolant the bubbles in the clearance are fragmented and the finely-divided gaseous phase together with the coolant comes from the clearance to the main flow of the coolant.

In other embodiments of the disperser, the lower disc can be stationary, and the upper disc can be a rotating one. Besides, the cavity connecting the near-coolant space and the hole in the disc can be placed both in the shaft and in the housing. The holes can be made both in the rotating disc and in stationary one (or both).

As mentioned above, the operation principle of the gas disperser is based on the fragmentation of gas bubbles in liquid upon injected into the flow with high velocity gradient. Due to the irregularity of Q force applied to the surface elements, the large bubbles in such a flow are broken down into small ones. In the preferable option of the disperser, high-gradient flow of liquid in the gas disperser is formed in the clearance between rotating and stationary discs. The degree of gaseous phase dispersion with all other conditions being equal depends on velocity gradient in the flow. The velocity gradient is increased by reducing the clearance between the discs or increasing the linear speed of the discs' relative motion.

Figure 4:
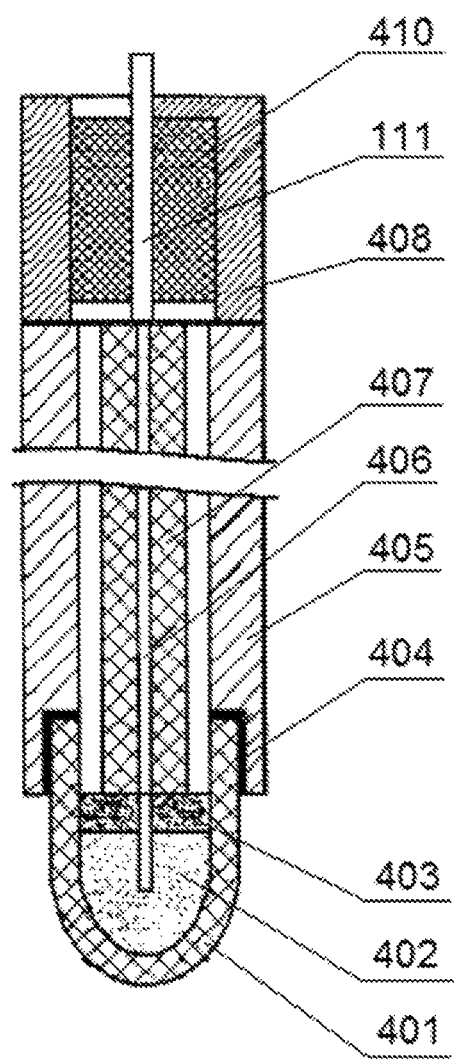
FIG. 4 shows an embodiment of oxygen concentration sensor in the coolant.

The reactor 101 is also equipped with an oxygen sensor 110 in the coolant 104. In the preferable option it is made in the form of an oxygen thermodynamic activity sensor; one of the options is shown in FIG. 4. The solid electrolyte oxygen sensor shown in FIG. 4 contains a ceramic sensing element 401 sealed in the reactor vessel 405, a reference electrode 402 and a center electrode consisting of two parts, the lower part 406 and the upper part 111 located in the sensor cavity.

The ceramic sensing element 401 is made of solid electrolyte in the form of a tubular element interlinked with a part of a sphere. Partially stabilized zirconium dioxide, fully stabilized zirconium dioxide or hafnium oxide can be used for the manufacturing of the element 401. The side face of the tubular element is connected to the inner side face of the reactor vessel 405 by means of a joining material 404 which can be a glass ceramic or pressed graphitized carbon fiber.

The sensor is equipped with a plug 403 made of metal oxide, for instance, aluminum. The plug has a hole and covers the cross section of the cavity of the ceramic sensing element 401. The plug is designed to fix the reference electrode 402 in the inner cavity of the ceramic sensing elements 401. The reference electrode 402 is located in the cavity between the inner surface of the ceramic sensing element 401 and the surface of the plug 403 and occupies at least a part of the cavity. The reference electrode 402 can be made of bismuth, lead, indium or gallium.

Facing the part of the spherical element the free end of the lower part of the center electrode 406 is brought out to the reference electrode 402 through a hole in the plug 403. It enables an electric contact between the reference electrode 402 and the lower part of the center electrode 406. At least a part of the ceramic sensing element sphere 401 protrudes beyond the reactor vessel 405 made e.g. of steel. During operation of the sensor, this protruding part is immersed in molten metal where the oxygen activity is determined.

The materials of the reactor vessel 405, ceramic sensing element 401, and joining material 404 have an equal thermal-expansion coefficient and are chemically resistant to operating environment, such as lead melt at temperatures not exceeding 650° C. This allows to keep the sensor operable at a change rate of temperatures (thermal shocks) in liquid metal of up to 100° C./s within the temperature range of 300-650° C.

A bushing 408 is welded to the free part of the reactor vessel 405. The upper part of the center electrode 111 shown in FIG. 1 as a cable or wire comes out of the cavity of the bushing 408 and passes through the wall 102 of the reactor vessel. The ring-shaped cavity between the bushing 408 and the upper part of the center electrode 111 is filled with dielectric material 410, preferably, glass ceramic. The material 410 ensures leak-tightness of the sensor inner cavity. It is necessary to prevent ingress of oxygen from the air into the inner cavity of the sensor and changes in the reference electrode properties. The lower part of center electrode 406 located in the internal cavity of the reactor vessel 405 is inserted into an isolator 407, preferably made of aluminum oxide.

The operation principle of the oxygen thermodynamic activity sensor is based on measurement of electric potential difference between two electrodes separated by solid electrolyte (for example, $ZrO_2 \div Y_2O_3$) with selective oxygen and ion conductivity. The value of the electric potential difference between two electrodes is formed by the difference of oxygen potentials between the controlled medium and medium with oxygen potential known in advance (reference electrode). As a reference electrode, such "liquid metal—solid oxide" systems as $\{Bi\}$-$<Bi_2O_3>$ can be used. The value of potential difference received from the sensor can be converted to the value of oxygen thermodynamic activity, its concentration or other convenient value. In another embodiment, the means of increasing oxygen concentration can be controlled depending on potential difference value received from the sensor (e.g. as per compliance table or by formula correspondence established by empiric or theoretic method).

The direct or converted reading of the oxygen sensor (e.g. oxygen thermodynamic activity) can be compared with the threshold values and, in accordance with the comparison results, decisions on activation of the mass-exchange apparatus or disperser can be taken. For instance, it can be specified that the oxygen concentration is below the threshold value, then the decision on the activation of one of the above mentioned devices shall be taken to increase the oxygen concentration (e.g. its thermodynamic activity).

Figure 5:
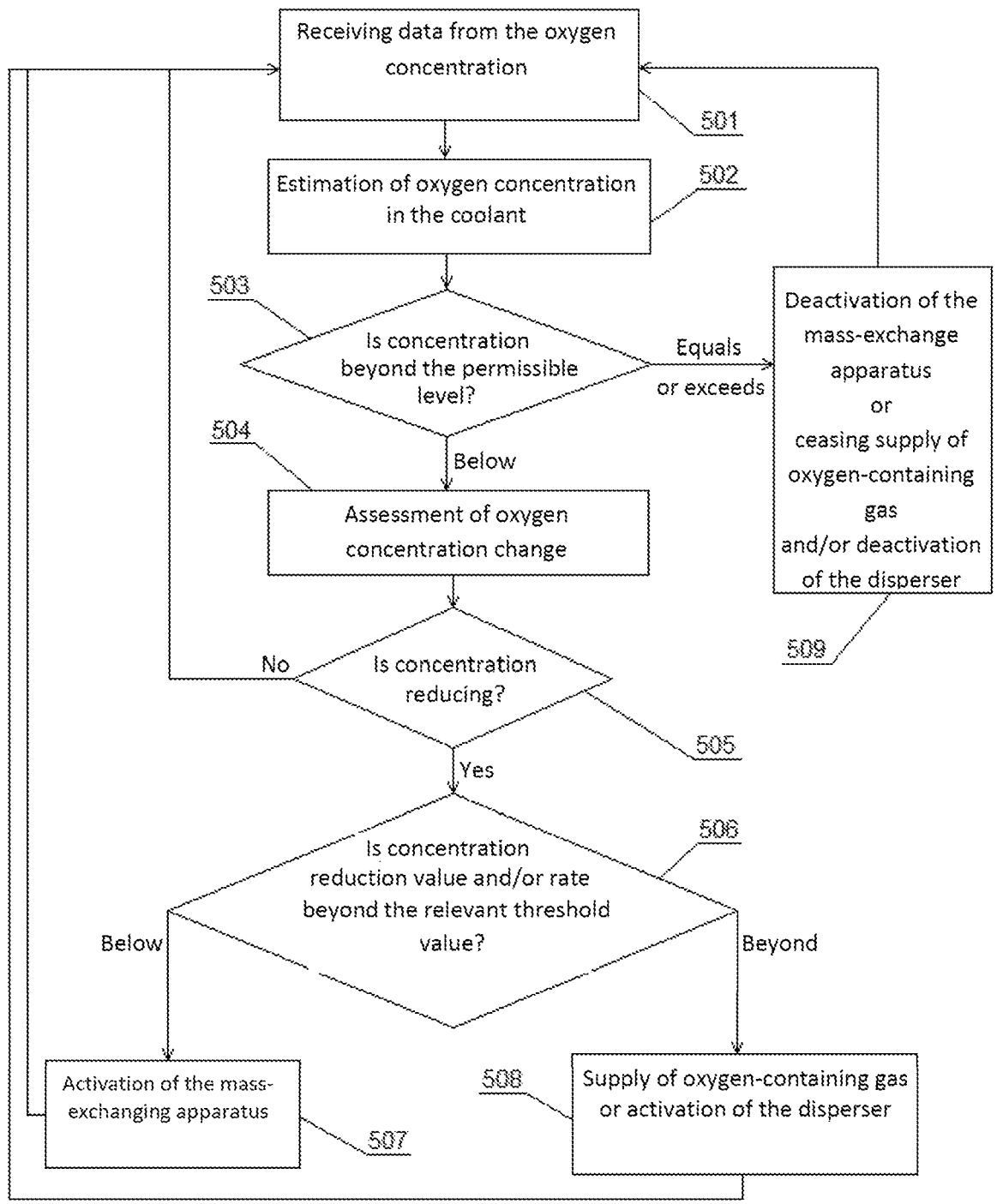
FIG. 5 shows a block scheme of the method for control of oxygen concentration in the coolant in accordance with this invention.

In accordance with this invention, the method for control of oxygen concentration allowing to achieve the above mentioned technical results shall include the following steps shown in FIG. 5.

Firstly, it is necessary to obtain the oxygen sensor reading (step 501), estimate the oxygen concentration in the coolant (step 502) based on the data received from the oxygen sensor in the coolant and compare the estimated oxygen concentration in the coolant with the permissible value (step 503). If the oxygen concentration is below the permissible value (below the minimum permissible value, i.e. beyond the range of permissible values), the change in the oxygen concentration in the coolant shall be estimated (step 504); as a result, the type of change in concentration (increase, decrease or maintenance of the former level), rate of change, value of change etc. can be determined.

The change in concentration and characteristics of such change can be assessed by comparing the estimated oxygen concentration in the coolant received from the sensor 110 at different times, or such assessments can be received in the form of derivatives with the use of different devices (for example, hardware derivation can be performed with the use of capacitive, inductive elements etc.) or by using any other methods known from the background of the invention. This method allows the change in concentration to be estimated based on the reading of the same sensor used for the determination of oxygen concentration, which decreases the number of equipment located in the reactor. This simplifies and cheapens the design, manufacturing and installation of the oxygen sensor in the coolant and the reactor plant on the whole. Besides, the usage of a single-type sensor enables redundancy in order to ensure safety and extend the operating life of the reactor plant, since sensors of other types do not occupy space in the reactor, and thereby preserve room for additional sensors of a single type. It should be noted that the equipment is unified during redundancy of a single-type sensor. This leads to simplification and cheapening of design, manufacturing and assembly of a reactor plant.

In another embodiment, it is possible to use the oxygen concentration sensors which will provide values corresponding to the change characteristics of oxygen concentration in the coolant. Such sensors may be called differential. Consequently, two or more types of sensors may be used (considering the sensor the readings of which allow to estimate the oxygen concentration in the coolant). As the mentioned sensors are designed to determine different characteristics of the same value (oxygen concentration), it allows to receive more precise estimates of those characteristics and values by common application of different-type sensors readings, as well as to replace the readings of sensors of one type with properly processed readings of other sensors in case of failure of any sensors, which, in turn, allows to improve safety and extend the operating life of the reactor plant.

To make a decision on the activation of the mass-exchange apparatus or disperser in the preferable embodiment, both assessments, the oxygen concentration and the change in oxygen concentration, are necessary, because it is preferable to activate the mentioned devices after the oxygen concentration is reduced to a level below the admissible (threshold) value (or range of values), which can be estimated in accordance with the readings reflecting the oxygen concentration. The decision, whether to activate the mass-exchange apparatus or the disperser, shall be based on the assessment of the change in oxygen concentration.

Next, it is necessary to determine, whether the estimated change in oxygen concentration in the coolant demonstrates reduction in concentration (step 505) and, if so, compare the reduction value and/or rate with the corresponding threshold value (step 506).

The reduction in concentration can be determined by different methods. For example, if one or more subsequent values of the oxygen concentration estimate is below one or more preceding ones, it can be assumed that the oxygen concentration has reduced. In another embodiment, if differential oxygen sensors are used, the reduction in oxygen concentration can be determined, if the readings of this sensor have the values corresponding to reduction in concentration. Besides, the reduction in oxygen concentration can be determined as per the assessment of the change value and/or rate of oxygen concentration. If these estimates have negative values, the reduction in oxygen concentration in the coolant can be recognized. If the estimates of the change value and/or rate of oxygen concentration which are opposite in sign to the similar estimates of the oxygen concentration change are used, the reduction in oxygen concentration in the coolant can be recognized, if these estimates have positive values. The change (reduction) value and/or rate of oxygen concentration in the coolant can be determined based on the readings of the oxygen sensor in the coolant (e.g. oxygen thermodynamic activity sensor in the coolant) or based on differential sensors reflecting the change in oxygen concentration.

If the estimate of oxygen concentration in the coolant is below the permissible value, the reduction in oxygen concentration is observed, and the estimated reduction value and\or rate of oxygen concentration is below the corresponding threshold value, the mass-exchange apparatus shall be activated (step 507). Otherwise, if the estimated oxygen concentration in the coolant is below the permissible value, the reduction in oxygen concentration is observed and the estimated reduction value and/or rate of oxygen concentration is above the corresponding threshold value, the oxygen-containing gas (gaseous mixture) shall be supplied from gas system to the near-coolant space and/or the disperser shall be activated.

In the latter case, five alternatives are possible in step 508. These alternatives lead to the achievement of the necessary result, which is the increase of oxygen concentration in the coolant. One of the alternatives suggests the supply of oxygen-containing gas to the near-coolant space from the gas system, e.g. in the amount not causing the pressure increase, but displacing oxygen-free gas (e.g. through the second pipeline of the gas system). To inject oxygen into the coolant, the disperser shall be in the active state. Consequently, this alternative is used, if before the supply of oxygen-containing gas the disperser was in the active state, for example, used for injection of oxygen-free gas (e.g. hydrogen gaseous mixture) into the coolant. The second alternative provides that the near-coolant space could have already contained the oxygen-containing gas before the activation of the disperser, and to achieve the result, i.e. the inlet of oxygen-containing gas into the coolant, and thereby increase the oxygen concentration, it is enough to activate the disperser. The third alternative suggests that, before achieving the necessary result, the gas in the near-coolant space did not contain oxygen, and the disperser was switched off; therefore, to increase the oxygen concentration, it is required not only to supply oxygen-containing gas to the near-coolant space (in the limiting case, it can be pure oxygen intended for mixing with gas in the mentioned volume), but also to activate the disperser. In the fourth alternative, the disperser is not activated and the oxygen-containing gas is supplied to the near-coolant space from gas system in the amount (volume) or under the pressure sufficient for the creation of such pressure in the near-coolant space which would cause the penetration of gas into the coolant even through the inactive disperser. In the fifth alternative, the oxygen-containing gas is supplied to the near-coolant space from the gas system in the amount (volume) or under the pressure sufficient for the creation of such pressure in the near-coolant space which would cause the penetration of gas into the coolant through the disperser, and the disperser is activated. This allows to extend the operating life of the disperser.

What all these alternatives have in common is that the result, i.e. the in increase of oxygen concentration, is achieved only with the presence of oxygen-containing gas in the near-coolant space under the pressure exceeding the internal pressure in the coolant where the outlet hole (holes) of the disperser are located. These alternatives differ only by their method for creating a required pressure difference and initial conditions: whether the disperser is activated or deactivated, and the presence of the oxygen-containing gas in the near-coolant space and its pressure. From this perspective, this invention shall be considered used, if any of the mentioned actions are carried out and lead to the supply of oxygen-containing gas from the near-coolant space to the coolant through the disperser (or by means of the disperser).

As mentioned above, the gas (including oxygen-containing gas) may be injected into the coolant even when the increased gas pressure is created in the near-coolant space and the disperser is not activated. But in this case, the outlet hole (holes) of the disperser may be clogged. Therefore, to achieve the result of this invention, i.e. reliability improvement and extension of the operating life of reactor equipment (which leads to improving safety and reactor plant operating life extension), when applying this method of gas supply into the coolant (due to the increased pressure of the gas in the near-coolant space), the disperser shall be activated in any case, so that the outlet hole (holes) at the lower end immersed in the coolant is flown around with the coolant to prevent accumulation of oxides, deposits, films etc. in/on it. It means that in step 508, the disperser shall be preferably activated, even if the oxygen-containing gas is supplied to the near-coolant space from the gas system in the amount causing the increase of gas pressure in the near-coolant space that leads to the inlet of gas (with oxygen) into the coolant without the activation of the disperser (although, the case without activation of disperser is included in this invention).

Besides, the very control of gas pressure in the near-coolant space in such a way that the gas penetrates into the coolant through the disperser on its own, even without the activation of the disperser, may be undesired due to formation of large-sized bubbles and is less accurate due to less precision of pressure control in the gas system than the control of disperser rotation speed, and, consequently, local decrease of pressure in the coolant near the rotating end (discs) of the disperser; therefore, it is preferable to control the oxygen concentration in the coolant with the use of an activated disperser.

If the oxygen concentration in the coolant is controlled using the methods involving an activated disperser, only the first three of the described step 508 alternatives of this invention shall be used. What these alternatives have in common is that the result, i.e. the increase of oxygen concentration is achieved only if there is oxygen-containing gas in the near-coolant space and the disperser injecting gas from the near-coolant space to the coolant is activated. These alternatives differ only by initial conditions: whether the disperser is activated or deactivated and the presence of oxygen-containing gas in the near-coolant space. From this perspective, this invention shall be considered used, if any of the mentioned actions are carried out and lead to the supply of oxygen-containing gas from the near-coolant space to the coolant by means of the disperser. However, it is necessary to take into account that the supply of oxygen-containing gas to the near-coolant space, both with creation of pressure exceeding the internal pressure of the coolant in this space (not only locally near the disperser but in the whole space) and without creation of such pressure, shall be, in any case, considered a result of supplying oxygen-containing gas to the near-coolant space, and thereby shall be one of the embodiments of this invention, shall fall within the scope of this patent and patent claim protection.

After activating the mass-exchange apparatus (step 507) or supplying oxygen-containing gas and/or activating the disperser (step 508), the oxygen concentration shall be checked, e.g. by using the same method as previously, i.e. by estimating the specified concentration. As shown in FIG. 5 this can be done by returning to step 501. When the oxygen concentration in the coolant estimated in step 502 and compared in step 503 assumes or exceeds the permissible value (approaches to/exceeds the upper limit of the permissible range in other embodiments), the mass-exchange apparatus shall be deactivated (step 509) or the disperser shall be deactivated and/or supplying oxygen-containing gas to the near-coolant space from gas system shall be stopped (if the natural consumption of oxygen in the near-coolant space, e.g. due to diffusion process, does not end quickly enough or it is required to completely remove oxygen from this space, the oxygen-free gas may be supplied to the near-coolant space from the gas system; besides, the oxygen-free gas may be immediately supplied from the gas system to the near-coolant space, which means that the supply of the oxygen-containing gas is over, because the gas being supplied does not contain oxygen). This allows to maintain the oxygen concentration in the coolant within the permissible range, i.e. the oxygen concentration in the coolant does not exceed the upper limit of the permissible range. Monitoring of "oxygen concentration in the coolant equals or exceeds the allowable value" condition is related to the fact that this invention aims at preventing the reduction in oxygen concentration, and the mass-exchange apparatus and disperser may only increase the oxygen concentration in the coolant. Therefore, to accomplish the invention objective, it is sufficient to provide oxygen concentration in the coolant equal or exceeding the permissible value with the use of the mass-exchange apparatus or disperser; then the oxygen concentration starts reducing due to the natural consumption of oxygen in the coolant for oxidation of structural material components; the mass-exchange apparatus or disperser are reactivated when the oxygen concentration is below the permissible value.

After the inlet of oxygen into the coolant is stopped, its concentration in the coolant is reduced down to the lower limit of the permissible value range, and when the oxygen concentration in the coolant (estimated value) is below the permissible value (which is preferably the lower limit of the permissible value range), the method shall be reapplied, i.e. the mass-exchange apparatus activated, the oxygen-containing gas supplied, and/or the disperser activated. For cyclical re-use of the method as per this invention, proceed to step 501, after the steps 507, 508 and 509 are implemented. In the represented embodiment, we proceed to this step, even if step 505 has determined that the concentration is not being reduced, but increased. In such case we can consider that there is no necessity for steps 507 or 508, as the oxygen concentration increases independently (e.g. if there is oxygen-containing gas in the near-coolant space, and oxygen penetrates from gas into coolant in the amount sufficient for the increase of oxygen concentration in the coolant).

Due to the method repeatability, we can ensure its repetition and automatic control of oxygen concentration in the coolant, which allows to lessen the necessity for intervention of qualified personnel and, to a certain extend, exclude their participation in reactor plant operation control. However, there is an option when the method does not cycle as per this invention. For example, step 509 can be implemented not following the condition of the admissible oxygen concentration restoration, but the timer activated after a certain time of the mass-exchange apparatus or disperser operation. Next, the control system may enter the standby mode to run the method from step 501 or run the method from this step automatically, thereby ensuring the repeatability and automatism of operation. It can be useful when the estimation of oxygen concentration has to be devoid of influence of different factors and requires the mass-exchange apparatus or disperser being deactivated and, consequently, not having the effect on the sensor readings at the moment of reading.

The threshold values of the change characteristics of oxygen concentration in the coolant such as speed, value and others, as well as the variable (range) of the permissible value of oxygen concentration in the coolant can be determined based on the preliminary theoretical or computed values or can be obtained by experiment during start-up and adjustment procedures or checking works (or combined). The particular threshold and permissible values depend on the design of a reactor plant and its manufacturing features and may vary from one reactor plant to another even within one reactor type and depending on modes of operation or preparation of reactor plant for operation. Ensuing the corrosion stability of the reactor structural materials, its safety and sufficient concentration of oxygen or characteristics of its increase for corrosion stability, safety and long-term operation of the reactor can be the criteria for determination of certain threshold and permissible values.

For example, in one of the possible embodiments the threshold (permissible) value of concentration of oxygen dissolved in the coolant can be determined by using the calculation and experimental method and have the value calculated by the following formula:

$$lgC=-0.33-2790/T+lgCs+lgjCPb,$$

where C is the concentration of oxygen dissolved in the coolant, weight %;

T is the maximum temperature of coolant in circuit, K;

Cs is concentration of oxygen dissolved in the coolant during saturation at temperature T, weight %;

j is the factor of lead thermodynamic activity in the coolant, reciprocal weight %;

CPb is concentration of lead in the coolant, weight %;

lg is mathematical operator of decimal logarithm (i.e. logarithm to base 10).

For example, if the reactor vessel is made of KH18N10T stainless steel and the eutectic alloy of lead with bismuth is used as coolant, the lowest feasible concentration of oxygen can be $2.6 \cdot 10^{-10}$ weight % (the value is determined based on the specified data and data obtained by using experimental or calculation method for a certain reactor plant design) at maximum temperature in reactor of 623 K (e.g. in the core or near the reactor wall). Despite the fact that the lowest feasible concentration of oxygen is allowed for operation of a reactor plant and can be used as the threshold (permissible) value, for example, if the oxygen concentration increases fast without time delays after the measured oxygen concentration is reduced below the values of the lowest feasible concentration of oxygen or approximated to this value, such situation are not desirable for improving safety of reactor operation.

In connection to this, the threshold or permissible values exceeding the lowest feasible concentration of oxygen can be assumed. For example, an objective to maintain oxygen concentration within the range of $6 \cdot 00^{-8}$-$6 \cdot 10^{-7}$ weight % can be set. If the concentration of the dissolved oxygen is reduced to the level of $6 \cdot 10^{-8}$ weight %, it can be determined that the lower threshold value is achieved and the decision on the increase of oxygen concentration in the coolant by using one of the methods described in this invention can be taken. After this decision is taken, the concentration of oxygen dissolved in the coolant increases and when the value of $6 \cdot 10^{-7}$ weight % is achieved, we can determine that the upper threshold value is achieved and, consequently, the decision to stop the increase of oxygen concentration in the coolant can be taken. In some embodiments, the upper threshold value may not be used, and the sufficient increase of oxygen concentration can be determined based on the time or other characteristics of oxygen concentration increase process (e.g. the increase of oxygen concentration can be stopped after the duration of this process from its beginning achieves the target value).

The threshold values of velocity, quantitative and/or other characteristics of oxygen concentration increase in the coolant can be determined by using the methods identical to the above-described and/or other methods known from the background of the invention.

The method steps shall be preferably implemented in the shown and described sequence, but in some embodiments, whenever possible, the steps can be performed in a different sequence or simultaneously.

The advantages of this method for control of oxygen concentration in the coolant are based on the following: The mass-exchange apparatus and disperser have different efficiency (productivity) which can be determined as increase velocity of oxygen concentration, i.e. increment of oxygen in volume per time unit. The mass-exchange apparatus has low (relative to disperser) rate or efficiency of oxygen concentration increase and can be used, for example, under normal operating conditions when the deviations from the threshold value and reduction rate of oxygen concentration to be compensated are low. However, the disperser has high (relative to the mass-exchange apparatus) rate of oxygen concentration increase and can be used, for example, in abnormal modes (e.g. if the oxide film is damage as a result of mechanical effects, such as earthquake etc.) or during the passivation of reactor walls (formation of oxide films on their surfaces) at the beginning of operation when the oxygen consumption rate which corresponds to reduction rate of oxygen concentration to be compensated is high.

Such segregation allows, on the one hand, precise control of oxygen concentration in the coolant under normal conditions when using the mass-exchange apparatus and, on the other hand, gives a chance to increase the oxygen concentration (or compensate for a sharp drop in oxygen concentration) in abnormal or other operation modes by means of a disperser. These opportunities, both precise control of oxygen concentration and its rapid growth (compensation of sharp drop) are essential for reactor safety.

Besides, such segregation of the devices for the increase of oxygen concentration depending on the required rate of oxygen concentration increase (efficiency of oxygen injection into the coolant) allows to extend the service life of a mass-exchange apparatus without replenishment of coolant component oxides. It is quite an important indicator, as the reserve of coolant component oxides in the mass-exchange apparatus is limited due to its limited size, and also due to the fact that the access to the mass-exchange apparatus or its recoverability should be limited to ensure safe operation of the reactor plant, as the reactor vessel should be sealed. Therefore, the application of two different devices for the increase of oxygen volume (concentration) in the coolant also improves the safety of the reactor by preventing failures of the mass-exchange apparatus due to the exhaustion of consumable material (solid-phase oxides of coolant components) and extends the time of safe operation of the reactor plant (without depressurization of reactor), since the reserve of consumable material in the mass-exchange apparatus is consumed only under normal conditions when the reduction rates of oxygen concentration to be compensated are low.

Figure 6:
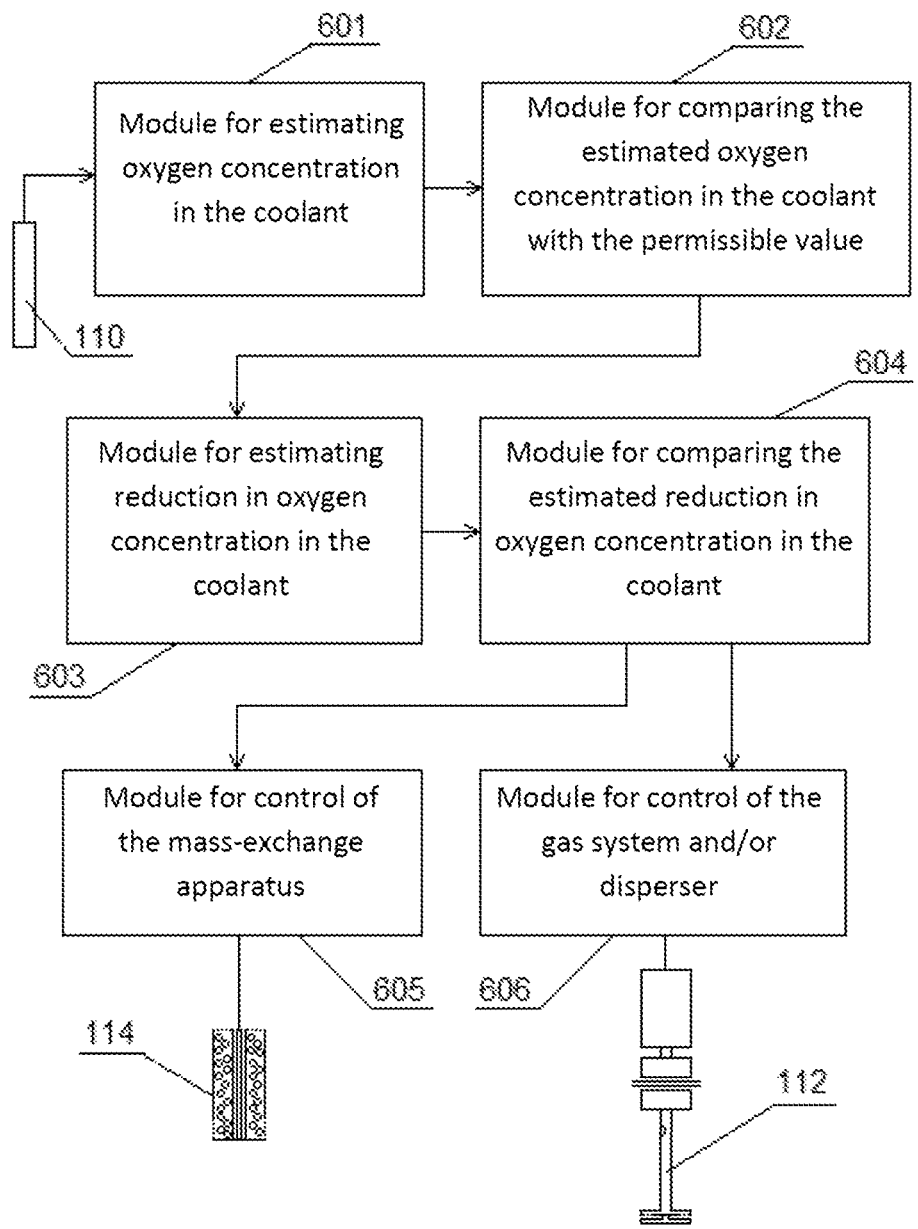
FIG. 6 shows a structural diagram of one of the embodiments of the device for control of oxygen concentration in the coolant in accordance with this invention.
Figure 7:
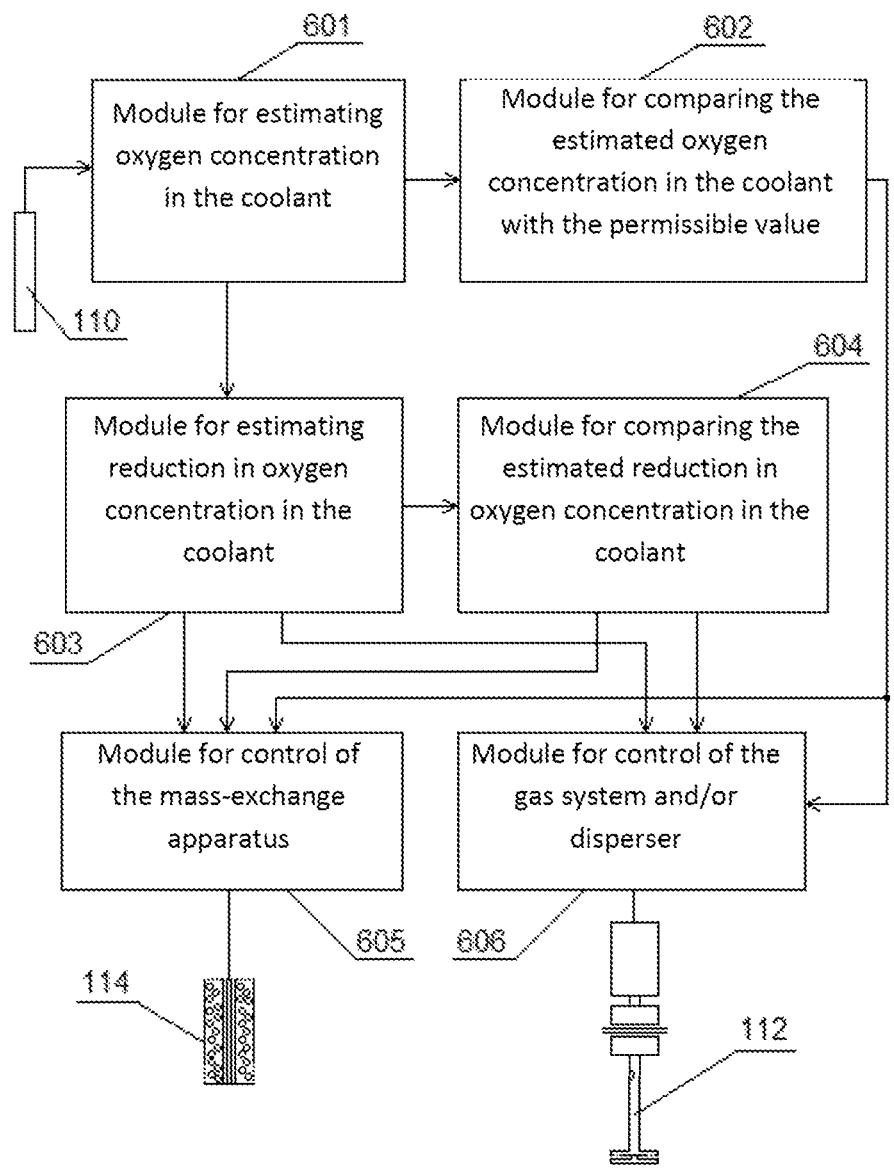
FIG. 7 shows a structural diagram of another embodiment of the device for control of oxygen concentration in the coolant in accordance with this invention.

To implement the above-described method of reactor equipment control, the control system can be used as per this invention. Such a control system two embodiments of which are shown in FIGS. 6 and 7 includes: a module 601 for estimating the oxygen concentration in the coolant, a module 602 for comparing the oxygen concentration in the coolant with the permissible value, a module 603 for estimating the reduction in oxygen concentration in the coolant, a module 604 for comparing the estimated reduction in oxygen concentration in the coolant, a module 605 for control of the mass-exchange apparatus and a module 606 for control of the gas system and/or disperser.

The module 601 for estimating the oxygen concentration in the coolant is adapted to receive data from the oxygen sensor 110 in the coolant, to estimate oxygen concentration in the coolant based on the received data and transmit the estimated value of oxygen concentration in the coolant to the module 602 for comparing the estimated oxygen concentration in the coolant with the permissible value;

The module 602 for comparing the estimated oxygen concentration in the coolant with the permissible value is adapted to receive estimated oxygen concentration in the coolant from the module 601 for estimating the oxygen concentration in the coolant and compare it with the permissible value.

The module 603 for estimating the reduction in oxygen concentration in the coolant is adapted to estimate the reduction value and/or rate of oxygen concentration in the coolant as well as to transmit the estimated reduction value and/or rate of oxygen concentration in the coolant to the module 604 for comparing the estimated reduction in oxygen concentration in the coolant.

In one of the embodiments, the module 603 for estimating the reduction in oxygen concentration in the coolant can be adapted to determine the reduction in oxygen concentration in the coolant. In this case, the estimated reduction value and/or rate of oxygen concentration in the coolant can be transmitted to the module 604 for comparing the estimated reduction in oxygen concentration in the coolant provided that the module 603 for estimating the reduction in oxygen concentration in the coolant has determined that the oxygen concentration in the coolant is being reduced. Upon that, it is not required to transmit the data on reduction in oxygen concentration in the coolant to the module 604 for comparing the estimated reduction in oxygen concentration in the coolant, and the module 604 for comparing the estimated reduction in oxygen concentration in the coolant can be put into service and control the operation of the module 605 for control of the mass-exchange apparatus and module 606 for control of the gas system and/or disperser (or transmit the results of data processing) upon receipt of the specified data on reduction in oxygen concentration in the coolant from the module 603.

In another embodiment, the estimated reduction value and/or rate of oxygen concentration in the coolant can be constantly transmitted to the module 604 for comparing the estimated reduction in oxygen concentration in the coolant. In this case, the module 604 for comparing the estimated reduction in oxygen concentration in the coolant can determine the reduction in oxygen concentration based on the values of estimated reduction value and/or rate of oxygen concentration in the coolant being within the corresponding range (e.g. if the values characterizing the reduction in oxygen concentration in the coolant are transmitted, the positive values of these characteristics shall correspond to the reduction in concentration, and the negative ones shall correspond to the increase of concentration; if the values characterizing the change in oxygen concentration are transmitted, the positive values of these characteristics shall correspond to the increase of concentration, and the negative ones shall correspond to the reduction in concentration; the selection of characteristics being transmitted and the corresponding range shall comply with the major objective of this system, i.e. improvement of the situation when the oxygen concentration in the coolant reduces). The module 604 for comparing the estimated reduction in oxygen concentration in the coolant can be put into service and control the operation of the module for control of the mass-exchange apparatus and the module for control of the gas system and/or disperser (or transmit the results of data processing) when it has been determined that the obtained values are within the range corresponding to the reduction in oxygen concentration.

In another embodiment, the estimated reduction value and/or rate of oxygen concentration in the coolant can be constantly transmitted to the module 604 for comparing the estimated reduction in oxygen concentration in the coolant, while the module 603 for estimating the reduction in oxygen concentration in the coolant is additionally adapted to determine the reduction in oxygen concentration in the coolant and transmit a signal on determination of reduction in oxygen concentration in the coolant to the module 604 for comparing the estimated reduction in oxygen concentration in the coolant. Then the module 604 for comparing the estimated reduction in oxygen concentration in the coolant can be activated (perform its functions) upon receipt of such a signal from the module 603 for estimating the reduction in oxygen concentration in the coolant.

The module 603 for estimating the reduction in oxygen concentration in the coolant enables to determine the reduction in oxygen concentration in the coolant and characteristics of this reduction based on the readings of a differential sensor which produces readings in the form of detailed data and which is shown in Figures. However, in the preferable embodiment, the module 603 for estimating the reduction in oxygen concentration in the coolant is adapted to estimate the reduction value and/or rate of oxygen concentration in the coolant (and determine the reduction in oxygen concentration in the coolant if provided) based on the estimated value of oxygen concentration in the coolant received from the module 601 for estimating the oxygen concentration in the coolant. As a result, the number of sensors installed in the reactor is decreased. In the final embodiment, the estimated value of oxygen concentration in the coolant can be transmitted to module 603 directly from module 601, as shown in FIG. 7, or through the module 602 for comparing the estimated oxygen concentration in the coolant with the permissible value, as shown in FIG. 6. It should be noted that the connection between modules 602 and 603 shown in FIG. 6 is mainly designed to transmit the comparison result of oxygen concentration assessment with the permissible value to module 603, and the estimated value of oxygen concentration in the coolant may not be transmitted (for example, when module 603 receives the data on the change in oxygen concentration in the coolant from a separate sensor or performs estimations based on the reading of sensor 110).

The module 604 for comparing the estimated values of reduction in oxygen concentration in the coolant compares the estimated reduction value and/or rate of oxygen concentration in the coolant with the corresponding threshold value and transmits the comparison result to the module 605 for control of the mass-exchange apparatus and module 606 for control of the gas system and/or disperser. The estimated reduction value and/or rate of oxygen concentration in the coolant is compared with the corresponding threshold value, i.e. the reduction value of oxygen concentration in the coolant is compared with the threshold value of reduction value of oxygen concentration in the coolant, and the reduction rate of oxygen concentration in the coolant is compared with the threshold value of reduction rate of oxygen concentration in the coolant.

The module 605 for control of the mass-exchange apparatus can activate the mass-exchange apparatus 114, if the estimated oxygen concentration in the coolant is below the permissible value and if the estimated change value and/or rate of oxygen concentration is below the corresponding threshold value.

The module 606 for control of the gas system and/or disperser can activate the gas system with supply of oxygen-containing gas to the near-coolant space and/or activate the disperser (depending on what is necessary for the oxygen-containing gas to start injecting into the coolant), if the estimated oxygen concentration in the coolant is below the permissible value and if the estimated change value and/or rate of oxygen concentration is above the corresponding threshold value. To activate the gas system, the module 606 can control the isolation valves and pumps included into the gas system.

Besides, the module 605 for control of the mass-exchange apparatus can deactivate the mass-exchange apparatus, and the module 606 for control of the gas system and disperser can deactivate the disperser and/or stop supplying the oxygen-containing gas to the near-coolant space from the gas system (or can supply the oxygen-free gas to the near-coolant space from the gas system) provided that the estimated oxygen concentration in the coolant assumes or exceeds the permissible value.

FIG. 6 shows the linear structure of device for control of reactor plant equipment where the signal and data are transmitted from one module to the next one, from the next one to the subsequent one and so on (except for modules 605 and 606 which are directly connected to the mass-exchange apparatus 114 and the gas system and/or disperser 112 and control their operation). In this case, modules 601-604 processing the data can transmit only the results of their own processing based on the data received from the preceding module or sensor, or can transmit all data received from the preceding module or sensor together with the result of their own processing to the next module. In such embodiment, modules 605 and 606 can receive the signals from module 604 on activation/deactivation of the corresponding devices, signals enabling/disabling the activation/deactivation of the corresponding devices (e.g. in binary form) or signals indicating the degree or scope of the required activation of the corresponding devices which can have a value from zero to maximum.

FIG. 7 shows the parallel structure of the control device when modules 601 and 603 transmit the results of their own processing to modules 602 and 604 for comparison with the given threshold values (as shown in FIG. 7; module 601 may also transmit the result of its own processing to module 603, but it is not necessary), and the processing results of modules 602 and 604 are transmitted to the modules 605 and 606 to be further compared and enable the activation/deactivation of the corresponding devices. To activate/deactivate a corresponding device, data on the reduction in oxygen concentration in the coolant below the allowable value (this data is transmitted from module 602) is required, as well as data on the reduction value/rate of oxygen concentration in the coolant (this data is transmitted from module 604).

Besides, proper operation of the control device (system) as per this invention requires data on the reduction in oxygen concentration in the coolant and the capability of modules 605 and 606 to withdraw this data from the data on reduction value/rate of oxygen concentration in the coolant received from module 604, to receive the information on reduction in oxygen concentration in the coolant with characteristics of such reduction from module 604, or to receive the data on reduction in oxygen concentration in the coolant from module 603 (the latter embodiment is shown in FIG. 7). In the embodiment of the control device shown in FIG. 7, modules 605 and 606 not only control the actuation devices (mass-exchange apparatus, gas system (in particular, its valves and pumps), disperser), but also analyze the incoming data and take decisions based on this data.

The structure of the control device (control system) as per this invention may have other configurations which may combine the above-described interim options or options received by exclusion or replacement. The structural diagrams shown in FIGS. 6 and 7 as well as the block scheme of control method shown in FIG. 5, the embodiments of reactor plant and devices shown in FIG. 1-4 are given for illustrations only and can limit the scope of patent assertion of this invention Any actions, objects, modules, elements, equipment and other attribute indicated in singular can also be considered as used if they are several in the plant or method, and on the opposite, if plurality is indicated, one object or action may be sufficient for the use of such attribute.

The control system can be automatic, i.e. the system can independently take and implement all decisions based on the data received and processed by system. Such automatic operation creates a closed cycle which includes an oxygen-containing coolant, an oxygen sensor, modules of processing and decision-making, modules for control of actuation devices which affect the coolant; the results of this effect are re-estimated with the use of oxygen sensors and the decisions on control of oxygen concentration in the coolant are taken again.

The advantage of such automatic control of oxygen concentration in the coolant is that the necessity for the qualified personnel to take part in reactor plant control may be eliminated. However, it may cause the risk of reactor plant functioning conditions exceeding the permissible limits due to the closeness of the control cycle in case of unlimited positive feedback, wherein an attempt to control the undesired deviation of a parameter results in a greater deviation of the parameter in the undesired direction (this may occur due to imperfection of processing algorithms and equipment failures).

In another embodiment, the control system of oxygen concentration in the coolant can be implemented with personnel involved in data processing and/or decision-making. This option requires involvement of highly qualified specialists. This will ensure the consideration of all possible parameters and exclude the reactor plant switch to hazardous or critical operation modes, as a human being, in contrast to an automatic device, is able to adaptively estimate the current situation and change action plans taking into account security and long-term operation issues.

To enable the personnel to receive data and interact with the control system, the reactor plant may have a control board equipped with indicating means such as light indicators (light panels, displays, information boards etc.), audio indicators (loud speakers, buzzers, alert systems etc.) and other, such as tactile displays. Furthermore, the control board can be equipped with input devices for requesting necessary information, testing and input of control commands. The input devices can be buttons, toggle switches, levers, keyboards, sensors, touch pads, trackballs, mice, sensor panels and other input devices known from the background of the invention Considering the variety of information equipment, the control board can be extended, for the personnel to use the board more conveniently. The equipment may include a rolling chair which, apart from operational comfort, ensures quick and easy access to remote parts of the control board and the operator can easily push off the current position and quickly get to the desired position due to progressive motion of the chair rolls.

However, it should be noted that both embodiments of the control system, the automatic one and the one involving personnel, have certain disadvantages. The manual control may have such a disadvantage as low speed of data processing and decision-making by personnel compared to the requirements of the reactor plant. On the other hand, the fully automated control system may be unsafe in case of failures or incomplete algorithms of data processing. As a result, the combined embodiment of the control system may be implemented, i.e. data processing and control are performed in automatic mode, but the data is displayed with the use of indicating means and, if any parameter exceeds the permissible limits (or approaches to the permissible limits)

or upon any necessity the qualified personnel can adjust the operation of the automated control system or control it manually.

The modules of the control system can be executed in hardware on the basis of discrete electronic components, integrated microcircuits, processors, assemblies, racks etc. The control system can be analog, digital or combined. Modules which are electrically connected to equipment located in the reactor or in the control board and control its operation or process the data may include the converters of voltage, current, frequency, analog signals to digital once and contrariwise, drivers, sources of current or voltage and control elements. All these elements and modules can be located on one or several mounting plates, can share one board or component or be separated accordingly, or can be executed and installed without the use of mounting plates.

The control system modules may also be executed in software. For this purpose, integrated microcircuits with programmable logic, controllers, processors and computers can be used as hardware; while software will include programs with commands and codes executed by means of the indicated microcircuits, controllers, processors, computers etc. connected to the reactor devices and equipment. The programs shall be stored in memory units which can be executed in various forms known from the background of this invention and can be data carriers read by computer: read-only memory, hard drives and floppy disks, optical disks, flash-drives, frame memory etc. The programs may include chains of codes or commands for implementation of method and algorithms as per this invention, in whole or in part. Microcircuits, controllers, processors and computers can be connected to the input/output devices which may be located separately or be included into the control board. Separate modules of the control system can be software modules or be combined into one or several programs as well as into one or several software packages or elements.

The control system and its modules may be executed as both hardware and software, i.e. part of the modules or all the modules may be executed in hardware, and part of the modules or control devices may be made as software. In the preferable embodiment, the control modules of reactor equipment (mass-exchange apparatus, gas system, disperser) and the modules for conversion of sensors can be made in hardware, and the modules for processing of data and commands, information display and control of processing parameters (such as threshold and permissible values) can be made as software on the basis of a computer, processor or controller. Additionally, specialized integrated circuits can be produced. Such circuits shall contain all the necessary hardware elements with programs or parameters of data processing to be downloaded into these circuits.

In the preferable embodiment, all electronic and other elements and components shall be made radiation-resistant to allow for operation of components and operability of the system in the whole as part of a nuclear reactor plant, which may be a source of ionizing radiation, and to preserve the capability of reactor operation control even in accident conditions and prevent possible adverse effects, thereby ensuring the enhanced safety and long operating life.

The invention claimed is:

1. A method for control of oxygen concentration in a coolant of a reactor plant including a reactor, the coolant located in the reactor, a gas system with an outlet to a space near the coolant of the reactor, a mass-exchange apparatus installed in the coolant, which contains solid-phase oxides of coolant and is adapted to flowing of the coolant through it, a disperser installed partially in the coolant and partially in the space near the coolant and adapted to supply gas from the space near the coolant to the coolant, and an oxygen sensor in the coolant, the method comprising:
    estimating an oxygen concentration in the coolant based on data received from the oxygen sensor in the coolant;
    comparing the estimated oxygen concentration in the coolant with a predetermined permissible value;
    estimating a change in oxygen concentration in the coolant;
    if the estimated change in oxygen concentration in the coolant shows reduction in concentration, then comparing a reduction value and/or a reduction rate of the oxygen concentration with a corresponding predetermined threshold value;
    if the estimated oxygen concentration in the coolant is below the predetermined permissible value and the reduction value and/or the reduction rate of the oxygen concentration is below the corresponding predetermined threshold value, then activating the mass-exchange apparatus;
    if the estimated oxygen concentration in the coolant is below the predetermined permissible value and the estimated reduction value and/or the estimated reduction rate of the oxygen concentration is above the corresponding predetermined threshold value, then supplying oxygen-containing gas from the gas system to the space near the coolant and/or activating the disperser; and
    if after the activating of the mass-exchange apparatus or after the supplying of the oxygen-containing gas and/or the activating of the disperser, the estimated oxygen concentration in the coolant is greater than or equal to the predetermined permissible value, then deactivating the mass-exchange apparatus or the disperser and/or stopping the supplying of the oxygen-containing gas from the gas system to the space near the coolant, wherein oxygen-free gas is supplied from the gas system to the space near the coolant in addition to stopping the supply of oxygen-containing gas from the gas system to the space near the coolant.

* * * * *